United States Patent [19]
Ter Horst

[11] Patent Number: 5,804,073
[45] Date of Patent: Sep. 8, 1998

[54] METHOD OF MAKING A PLEATED STRUCTURE HAVING A PLEATED MEMORY SHAPE AND THE FILTER MEDIA MADE THEREFROM

[76] Inventor: Dirk Dieter Hans Ter Horst, Apartado 80 150, Caracas 1080A, Venezuela

[21] Appl. No.: 681,456

[22] Filed: Jul. 22, 1996

[51] Int. Cl.⁶ .................................................. B01D 27/06
[52] U.S. Cl. ................................ 210/493.3; 210/493.5; 156/204; 156/227; 156/474; 55/521; 55/528; 493/415; 493/941
[58] Field of Search ..................................... 156/204, 227, 156/474; 210/493.5, 493.3; 55/521, 528; 493/415, 941

[56] References Cited

U.S. PATENT DOCUMENTS

| | | | |
|---|---|---|---|
| 4,410,427 | 10/1983 | Wydeven | 210/493.3 |
| 4,940,500 | 7/1990 | Tadokoro et al. | 55/521 |
| 4,961,974 | 10/1990 | Jones | 55/528 |
| 5,053,066 | 10/1991 | Hassenboehler | 55/521 |
| 5,531,235 | 7/1996 | Hassenboehler, Jr. | 131/332 |

*Primary Examiner*—W. L. Walker
*Attorney, Agent, or Firm*—Bachman & LaPointe, P.C.

[57] ABSTRACT

A method for making a pleated structure having a pleated shape memory includes providing an elongated material having a longitudinal axis; pleating the material to form a pleated structure having a plurality of substantially parallel pleats substantially parallel to the longitudinal axis; folding the material along a plurality of axes substantially perpendicular to the longitudinal axis to form folds and provide a folded structure defining wall portions between the folds and face portions at the folds; heating the material in the pleated structure so as to provide a heated material; and cooling the heated material so as to provide the material with shape memory toward the pleated structure.

41 Claims, 3 Drawing Sheets

METHOD OF MAKING A PLEATED STRUCTURE HAVING A PLEATED MEMORY SHAPE AND THE FILTER MEDIA MADE THEREFROM

BACKGROUND OF THE INVENTION

The present invention relates to a filter assembly, particularly a filter pack structure and a method for forming same.

Filters for air and other gases are commonly used in hostile environments and typically require a high degree of structural integrity and performance characteristics. Conventional filters, for example for gas turbine and compressor intake equipment and the like, typically use a filter pack formed from a filter media. In general, filters such as those described above include a casing or housing member which contains the filter pack formed from suitable filter media.

The function of the filter pack is to filter air passing through the filter. It is desirable to position the filter media within the housing in such a way as to provide as low a pressure drop across the filter as possible. Pressure drop across the filter is attributed to two primary sources.

The first source is called a media pressure drop (MPD) and refers to the pressure drop caused by the filter media. Since this pressure drop is related to the velocity of air passing through the filter media, the media pressure drop is reduced as the area of filter media through which air passes is increased.

The other source of filter pressure drop is the configuration pressure drop (CPD), which is a pressure drop caused by the configuration of filter media within the casing or housing which obstructs flow therethrough.

Referring to FIGS. 1–3, FIG. 1 shows a simple filter media configuration wherein the media pressure drop is relatively high due to a high air to media ratio. The configuration pressure drop of the configuration of FIG. 1 is very low or negligible due to an absence of obstacles to air flow through the filter.

Referring to FIG. 2, the filter media is provided in a zig-zag pattern allowing more media to be disposed within the same casing space. This configuration is referred to in the industry as an extended surface filter. The configuration provides a lower air to media ratio which produces a lower media pressure drop than the configuration of FIG. 1. Further, the configuration of FIG. 2 does not create a significant configuration pressure drop. Thus, the filter pressure drop of the configuration of FIG. 2 would be lower and therefore more preferable than the filter pressure drop of FIG. 1.

FIG. 3 shows a configuration wherein a very large amount of filter media is disposed within the casing, so as to provide a very low media pressure drop. However, the configuration of the filter media is so congested as to create a large configuration pressure drop which would practically inhibit any flow whatsoever through the filter. Thus, the large configuration pressure drop of the configuration of FIG. 3 would provide this filter with an unacceptably high filter pressure drop.

A problem encountered with providing filter media in a configuration such as that shown in FIG. 2 is the problem associated with maintaining the filter media in a desired configuration. Typically some form of structure is required to enhance the rigidity of the filter media. One method for enhancing the rigidity of a filter configuration such as that of FIG. 2 is to apply an open and rigid backing to the media such as a wire mesh or expanded metal. However, application of such a backing to the filter media significantly impedes pleating or folding of the media to desired configurations.

Another method for enhancing the rigidity of such filter media is to place separators between filter media pleats or folds so that the media is kept in place and does not collapse due to air flow. However, the separator elements required for this solution add an additional source of cost to the filter, and also contribute to the configuration pressure drop.

Another approach to solving the rigidity problem of the filter media is to apply a glue bead to the filter media after it has been pleated or folded, and the glue bead is intended to separate the pleats of media sufficiently to allow a low flow of air. This is suitable for some very high efficiency air filters handling low rates of air flow. However, this approach does not allow for a large air flow rate through the filter.

Considering the foregoing, it is clear that the need remains for a filter pack structure which provides enhanced rigidity of the filter media against shifting or collapsing due to air flow, and which provides a sufficiently low filter pressure drop while avoiding significant increase in cost of the filter.

It is therefore the primary object of the present invention to provide a method for forming a filter pack structure which is substantially rigid and therefore resists shifting due to air flow.

It is a further object of the present invention to provide a method for forming a filter pack structure which does not require additional materials to provide the desired rigidity.

It is a still further object of the present invention to provide a method for forming a filter pack structure which is readily incorporated into a continuous forming procedure without adding significantly to the cost of forming the filter pack structure.

It is another object of the present invention to provide a method for forming a filter pack structure which allows increased filter media without significantly increasing the configuration pressure drop of the filter.

It is another object of the present invention to provide a method for forming a filter pack structure which has a good air flow to media ratio without significantly increasing the configuration pressure drop.

It is still another object of the present invention to provide a filter pack structure possessing each of the foregoing advantages.

Other objects and advantages of the present invention will appear hereinbelow.

SUMMARY OF THE INVENTION

In accordance with the present invention, the foregoing objects and advantages are readily attained.

According to the invention, a method for making a pleated structure having shape memory is provided which comprises the steps of providing an elongated material having a longitudinal axis; pleating said material to form a pleated structure having a plurality of substantially parallel pleats substantially parallel to said longitudinal axis; folding the material along a plurality of axes substantially perpendicular to the longitudinal axis to form folds and provide a folded structure defining wall portions between the folds and face portions at the folds; heating the material in the pleated structure so as to provide a heated material; and cooling the heated material so as to provide the material with shape memory toward the pleated structure.

Further according to the invention, a method for forming a filter pack structure is provided wherein the material is a filter media and the folding step provides a filter pack having a zig-zag folded structure.

In further accordance with the present invention, a filter pack structure is provided which comprises a filter media folded along a plurality of axes in a substantially zig-zag folded structure to provide a plurality of wall portions connected at alternating edges by face portions, and having a pleated structure including pleats along fold lines substantially perpendicular to the axes to provide each wall portion and face portion with alternating peaks and valleys, wherein the filter media has shape memory toward the pleated structure.

BRIEF DESCRIPTION OF THE DRAWINGS

A detailed description of preferred embodiments of the present invention follows, with reference to the attached drawings wherein.

DETAILED DESCRIPTION OF THE DRAWINGS

The invention relates generally to a pleated structure having shape memory and more specifically to a filter pack structure and method for forming same which advantageously provide a rigid filter pack structure formed from filter media which filter pack structure allows a large amount of filter media to be placed in a filter casing while providing a low filter pressure drop as desired.

Figure 1:
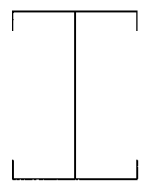
FIGS. 1–3 schematically illustrate several different configurations of filter media within a filter casing.
Figure 2:
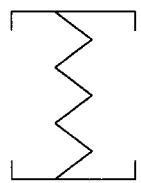
Figure 3:
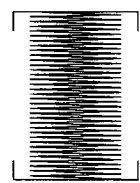

As set forth above, FIGS. 1–3 illustrate several configurations of filter media disposed within a filter casing and providing various levels of media pressure drop and configuration pressure drop. The configuration of FIG. 1 has the highest media pressure drop and the configuration of FIG. 3 has the highest configuration pressure drop. The configuration of FIG. 2 provides the most advantageous overall filter pressure drop of the configurations illustrated. In accordance with the present invention, a filter pack structure and method for forming same are provided which advantageously result in a low media pressure drop and also in a low configuration pressure drop, thereby providing an advantageously low total filter pressure drop.

Figure 4:
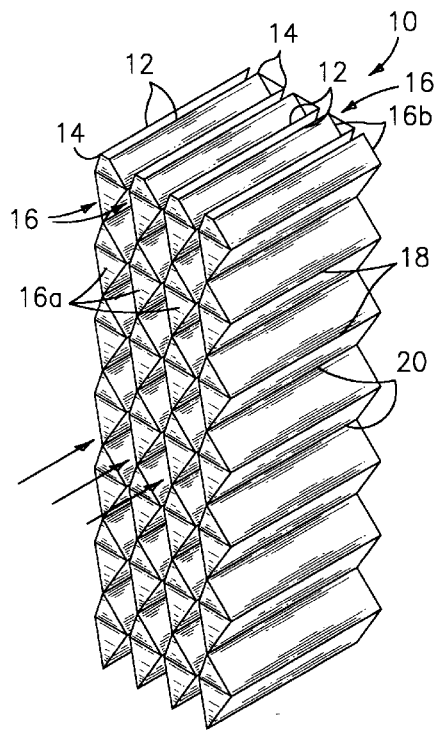
FIG. 4 is an isometric schematic view of a portion of a filter assembly according to the invention.

Referring to FIG. 4, a portion of a filter pack structure in accordance with the present invention is generally referred to by reference numeral 10. As shown, filter pack structure 10 preferably is formed from a suitable filter media which is folded into a substantially zig-zag pattern so as to define a plurality of wall portions 12 connected at alternating edges 14 by face portions 16. The filter media of filter pack structure 10 is pleated, according to the invention, so as to provide each wall portion 12 with alternating peaks 18 and valleys 20 as shown. Further, the folding of filter pack structure 10 provides wall portions 12 wherein the peaks 18 of adjacent wall portions 12 are substantially adjacent to each other. In use, filter pack structure 10 is positioned with alternating face portions 16a facing toward an incoming flow of air or other fluid to be filtered as shown in FIG. 4, and with remaining face portions 16b on the air leaving or outlet side of filter pack structure 10.

The filter media of filter pack structure 10 is pleated so as to provide peaks 18 and valleys 20 and then treated so as to provide the filter media with a set or shape memory which urges the material toward the pleated structure. This is desirable so as to provide filter pack structure 10 with enhanced rigidity so as to resist shifting or undesirable displacement within a filter casing due to air flow and to provide a filter pack structure 10 which readily folds into shape. Also as will be discussed, the filter media of the present invention is preferably provided with the desired set or shape memory through a heating and cooling step. It should be noted, of course, that other methods for providing the material with the desired set could be used in accordance with the present invention depending upon the materials used as filter media.

Figure 5:
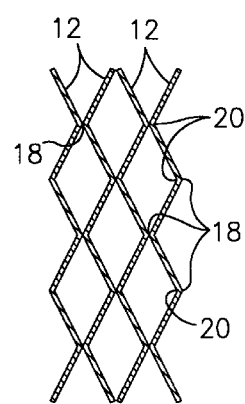
FIG. 5 is partial cross-section along the lines 5—5 of FIG. 4.

FIG. 5 is a schematic view taken along the cross-section of lines 5—5 of FIG. 4 and shows a section of filter pack structure 10 having a number of wall portions 12. FIG. 5 further illustrates the substantially adjacent positioning of peaks 18 of adjacent wall portions 12. This is desirable in accordance with the present invention as contact of adjacent peaks 18 serves to further support the filter media of filter pack structure 10 in a desired configuration against shifting or collapsing.

Figure 6:
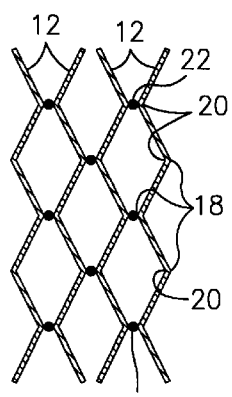
FIGS. 6–8 illustrate alternative embodiments of the cross-section of FIG. 5.

In the embodiment of FIG. 5, peaks 18 of adjacent wall portions 12 rest loosely against each other and support one another when wall portions 12 are biased toward each other. If desired, adjacent peaks 18 can be secured or bonded together as shown in FIG. 6, for example, with glue 22 or any other suitable adhesive. Also, depending upon the material, peaks 18 could be thermally bonded together. Of course, numerous methods are known by which adjacent peaks 18 could be secured to each other and the term bonding when used to refer to the attachment of adjacent peaks 18 is not intended to indicate any specific means for affixing. Rather, any suitable method for joining peaks 18 of the filter media used is intended to fall within the scope of the term bonding as used herein. The structure illustrated in FIG. 6 serves to further advantageously provide filter pack 10 with enhanced rigidity as desired.

Figure 7:
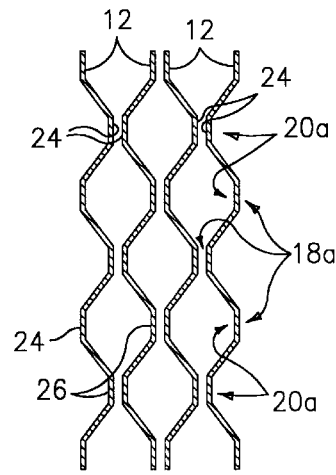

Referring to FIG. 7, a further alternative embodiment of the present invention is illustrated wherein wall portions 12 are provided with pleats so as to form peaks 18a and valleys 20a from a double fold thereby defining substantially flat peak surfaces 24 and substantially flat valley surfaces 26. Substantially flat peak surfaces 24 are advantageous in that additional surface area is provided for adjacent wall portions 12 to support each other. The flat peak surface structure of this embodiment may be provided to filter pack structure 10 in accordance with the invention as shown FIG. 19 through the application of heat and pressure. This process will be further discussed below. As with the configurations of the embodiments of FIGS. 5 and 6, adjacent peak surfaces 24 could be bonded together for additional rigidity in accordance with the present invention if desired.

Figure 8:
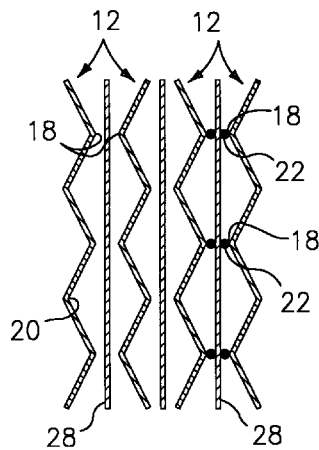

Referring to FIG. 8, a further alternative embodiment of filter pack structure 10 of the present invention is illustrated wherein separator members 28 are positioned between adjacent wall portions 12 so as to further enhance the rigidity and resistance to collapse of structure 10. Separator members 28 are preferably provided from any suitable material such as, for example, filter media, cardboard, metal-aluminum, plastic and the like, and may be provided as substantially flat structures as illustrated in FIG. 8, or any of a wide variety of alternative structures which serve to hold wall portions 12 in position in accordance with the invention. For example, separators could be provided from cord or wire materials, and the like. Further, as shown in the right-hand portion of FIG. 8, separator members 28 could be bonded to adjacent peaks 18 for still further enhanced rigidity, if desired.

Figure 9:
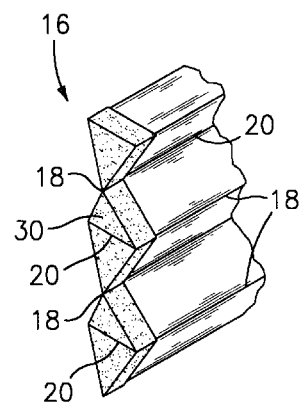
FIG. 9 illustrates a portion of a filter pack structure having a reinforced face portion in accordance with the invention.

FIG. 9 shows a portion of a filter pack structure 10, specifically a face portion 16 thereof. As should be apparent from a consideration of FIGS. 2 and 4, some face portions 16a of filter pack structure 10 will be facing toward the incoming air flow directed to the filter casing in which filter pack structure 10 is positioned. Obviously, these face portions 16a are subjected to increased wear due to impingement of entrained particulate matter and the like carried by air to be filtered with filter pack structure 10.

Conventionally, filter pack structures generally are protected with a screen member positioned at the inlet of the filter to remove the largest of such particulate matter. In accordance with the invention however, face portions 16 may suitably be treated with a wear resistant coating 30 such as a glue, epoxy, plastic, cement, paint and the like, or mixtures thereof, so as to protect face portions 16 from impingement by the air flow, and reduce or eliminate the need for protective screens at the inlet of the filter. It is particularly desirable to treat face portions 16 on the air inlet side of a filter pack structure 10 which are subjected to wear from incoming air or fluid to be filtered. The provision or application of protective coating 30 in accordance with the present invention also advantageously serves to enhance the rigidity of filter pack structure 10 by providing a set for filter pack structure 10 to retain the fold structure defining face portions 16.

It should be readily apparent that the embodiments of the present invention discussed above provide a filter pack structure 10 which advantageously possesses enhanced structural rigidity and therefore resists undesirable shifting or collapsing due to flow through the filter. It should also be noted that variable flow rates are a problem in the industry, and such flows tend to further cause filter collapse and the like. The enhanced rigidity provided by the structure of the present invention further serves to allow filter pack structure 10 to be used to filter variable flow rates of air or other fluid with further enhanced resistance to filter collapse.

Referring now to FIGS. 10–14, one embodiment of a method for forming filter pack structure 10 in accordance with the invention will be described.

Figure 10:
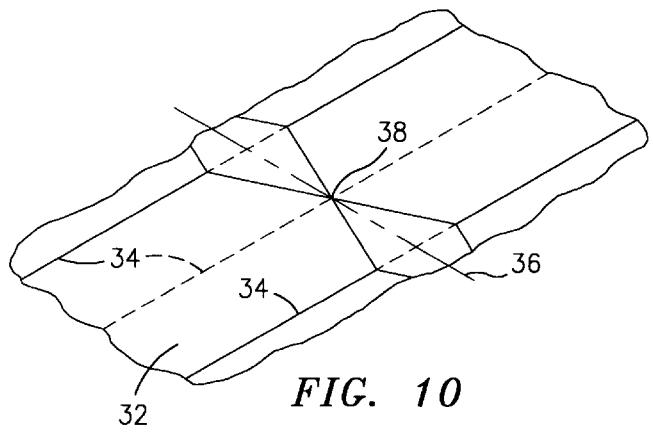
FIG. 10 illustrates a suitable scoring of filter media in accordance with the present invention.

Initially, filter media 32 is preferably provided in a substantially elongate or web structure as will be further discussed below, a portion of which is illustrated in FIG. 10. FIG. 10 shows filter media 32 preferably scored along longitudinal fold lines 34 to provide for subsequent pleating. Filter media 32 is preferably also scored along a number of axes 36 which are preferably substantially perpendicular to fold lines 34 and which are to form the basis for folding into the substantially zig-zag shaped filter pack structure 10 also as will be further described below.

Scoring may be carried out using conventional scoring equipment which may also provide for scoring using heat if desired. Further, scoring or heated scoring may be performed initially, intermediately, or as a final step in the production of a filter pack structure 10 in accordance with the present invention, or at several of these stages.

As shown in FIG. 10, scoring along axes 36 is preferably provided in a substantially diamond-shaped pattern centered along axis 36. The diamond-shaped pattern is preferably provided with adjacent points 38 of individual diamond-shapes contacting one another and positioned on axes 36 as shown. Filter media 32 is preferably scored along axes 36 at a spacing between axes 36 defining the desired length of wall portions 12.

Figure 11:
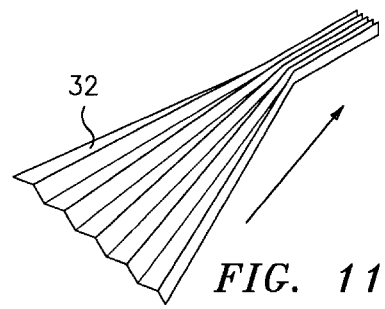
FIG. 11 illustrates a pleating step in accordance with the present invention.

Referring to FIG. 11, filter media 32 is preferably pleated, most preferably after scoring, so as to define alternating peaks 18 and valleys 20 running longitudinally along the length of filter media 32 as shown. Pleating can also be carried out using conventional pleating equipment, and may be carried out simultaneously with the application of heat as the beginning of or a part of the heating step to provide shape memory.

Figure 12:
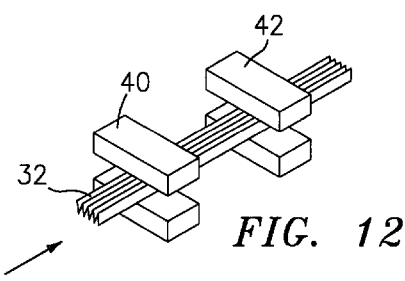
FIG. 12 schematically illustrates a heating and cooling step for providing the filter media with a pleat set in accordance with the present invention.

Referring to FIG. 12, filter media 32 is treated after pleating to provide filter media 32 with a set which is biased toward the pleated or folded condition. FIG. 12 schematically shows a heat applying station 40 and a cooling station 42. By feeding pleated filter media 32 first to the heat applying station 40 and subsequently to cooling station 42, filter media 32 is provided with a set which tends toward the pleated shape rather than the original starting flat shape. As set forth above, this set of the filter media material is desirable so as to further enhance the rigidity of the final filter pack structure 10 which is formed in accordance with the method of the present invention.

In further accordance with the invention, suitable filter media may include fibrous or non-fibrous material, woven or non-woven fabric, paper, cloth, metal-aluminum, plastics and the like. A particularly suitable example of filter media for use in accordance with the invention is a material identified as Hollingsworth & Vose Media HF0393. HF0393 filter media has been found to adopt a suitable shape memory or set through the application of heat at a temperature of at least about 460° F. for at least about 3 minutes. Of course, other materials may have significantly different temperatures and times of exposure during which acceptable set or shape memory is accomplished.

It should of course be noted that although FIG. 12 shows a cooling station 42 for positively cooling the heated filter media, it is within the scope of the present invention to simply allow heated filter media 32 to cool passively to the desired temperature. Cooling station 42 is advantageous, however, in that cooling is accomplished in less time thereby shortening the overall path length required to form filter pack structure 10 in accordance with the invention.

Figure 13:
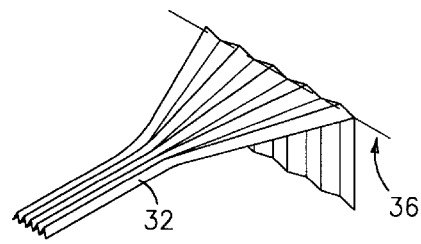
FIG. 13 illustrates a folding step for forming a filter pack structure in accordance with the present invention.

Referring to FIG. 13, after filter media 32 is set in the pleated structure, filter media 32 is preferably spread laterally along axes 36 as shown, and then folded along axes 36 in alternating directions so as to provide the desired final zig-zag configuration of filter pack structure 10 according to the invention. After folding along axes 36, filter media 32 is laterally released allowing the material to return to the set pleated structure forming face portions 16 at the folds along axes 36 which also have peaks 18 and valleys 20 as shown in FIGS. 4 and 9.

Figure 14:
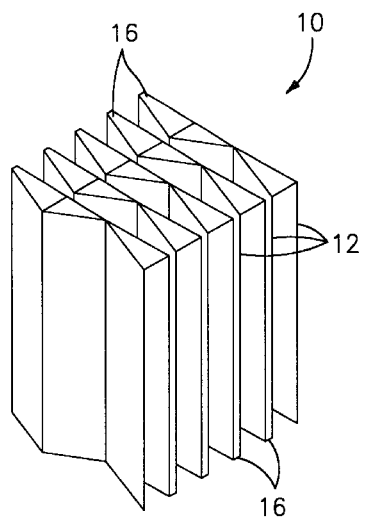
FIG. 14 illustrates a portion of a filter pack in accordance with the present invention formed according to the steps of FIGS. 10–13.

Referring to FIG. 14, filter media 32 is preferably folded in alternating opposite directions until a sufficient number of folds and resulting wall portions 12 are defined, at which point filter pack structure 10 is provided and ready for positioning within a filter casing structure according to the invention.

Figure 15:
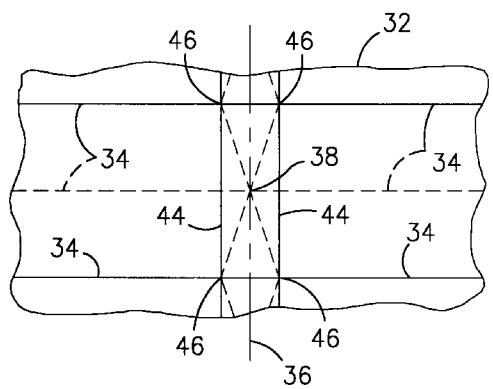
FIGS. 15–17 schematically illustrate the steps of an alternative method in accordance with the present invention.
Figure 16:
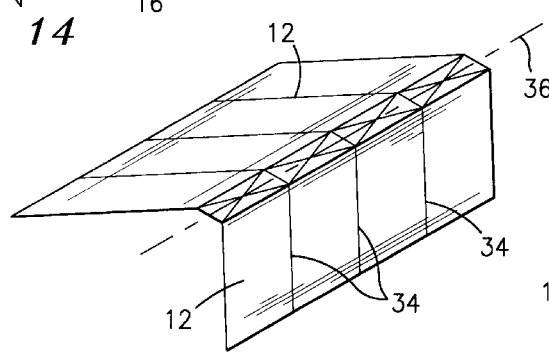
Figure 17:
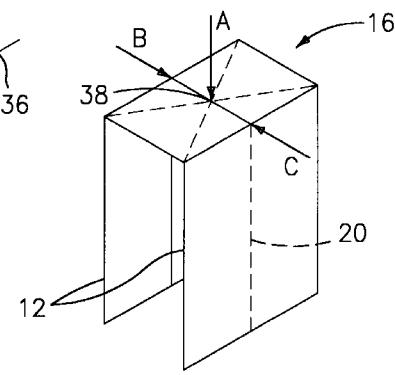

FIGS. 15–17 illustrate an alternative method for forming a filter pack structure 10 in accordance with the present invention. FIG. 15 shows an initial scoring step including substantially parallel fold lines 34 as shown. Further, a diamond-shaped scoring pattern is preferably centered around axes 36. In this embodiment, however, additional straight fold lines 44 are also preferably scored into filter media 32, preferably substantially parallel to axes 36 and spaced to either side thereof so as to coincide with the longitudinally extending points 46 of the scored diamond-shapes.

In accordance with this embodiment of the invention, filter media 32 is pleated as shown in FIG. 11 and in an identical procedure as that discussed above. The pleated structure is then preferably treated as illustrated in FIG. 12 so as to provide filter media 32 with a set toward the pleated condition.

Figure 18:
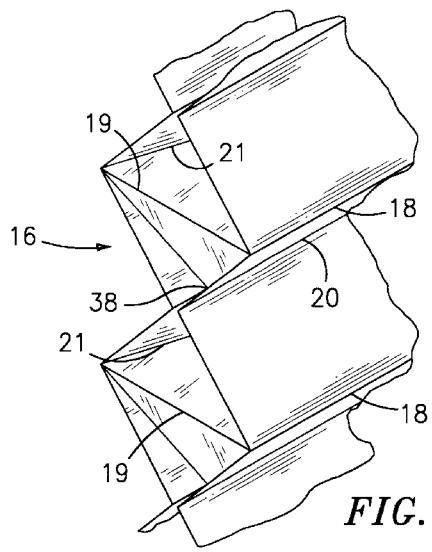
FIG. 18 illustrates a face portion of a filter pack structure formed according to the embodiment of FIGS. 15–17.

As shown in FIG. 16, pleated and set filter media 32 is then preferably folded along fold lines 44, and forces A, B and C are applied to face portions 16 of filter media 32 as shown in FIG. 17. Force A is preferably applied at the location where points 38 cross and coincide with axes 36 while forces B and C are preferably inwardly applied to edges of face portion 16 at score lines corresponding to valleys 20 aligned with points 38. This advantageously provides filter pack structure 10 with face portions 16 as shown in FIG. 18 having further enhanced rigidity as desired in accordance with the present invention. Application of forces A, B and C result in face portions 16 having a series of substantially X-shaped or hour-glass-shaped indentations 21 divided by peaks 19 positioned therebetween. This configuration also advantageously serves to provide face portions 16 of filter structure 10 with enhanced rigidity as desired.

It is noted that the heating and cooling step as illustrated in FIG. 12 is described above as being carried out after the material is pleated. It is noted that heating and cooling could be carried out at other specific time periods or after other steps in the method of the present invention, or in several stages or discrete steps if desired. For example, heating and cooling may be performed at the end of the process, after pleated filter media is folded along axes 36 to the desired end zig-zag shaped structure.

Figure 19:
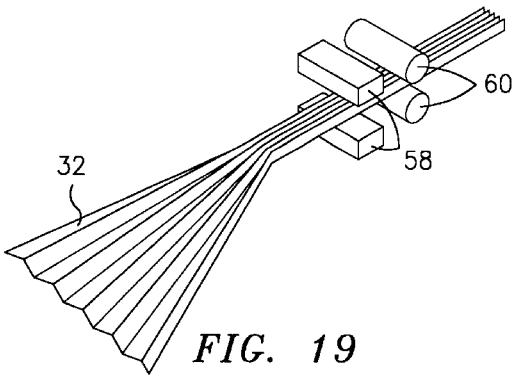
FIG. 19 illustrates a step of an alternative embodiment of the method of the present invention.

As set forth above, one embodiment of the present invention calls for the provision of peaks and valleys having substantially flat surfaces 24, 26. FIG. 19 illustrates a method for providing substantially flat surfaces 24, 26 of peaks and valleys in accordance with the invention. As shown, a pleated web may suitably be fed first to a heating station 58 where the web is heated to a temperature sufficient for providing the material of the web, upon cooling, with shape memory as desired, and is subsequently fed to a pressure roller station 60 for pressure rolling peaks 18 into substantially flat peak surfaces 24. Upon cooling, substantially flat surfaces 24 have shape memory toward the desired configuration. It should of course be noted that a wide number of alternative methods may be used to provide substantially flat surfaces 24, 26 as desired in accordance with the invention.

Figure 20:
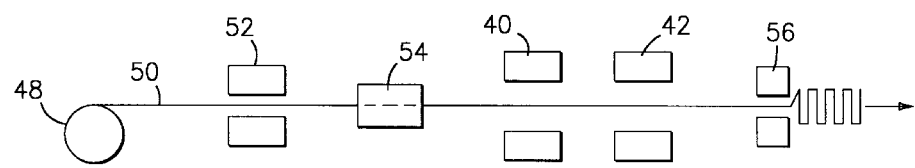
FIG. 20 schematically illustrates a continuous process for forming a filter pack structure in accordance with the present invention.

Referring now to FIG. 20, a preferred embodiment of the method for forming filter pack structure 10 in accordance with the present invention will be discussed. As shown, filter media 32 may preferably be provided for example from a feed roll 48 and provided as a substantially continuous web 50 which is fed to various stations for treatment as discussed above. As shown in FIG. 20, web 50 of filter media 32 may suitably first be fed to a scoring station 52 (shown schematically) so as to provide a scored web material having scoring as discussed above in connection with FIGS. 10 and 15.

From scoring station 52, scored filter media is fed to a pleating station 54 for carrying out pleating as shown and discussed with respect to FIG. 11.

From pleating station 54, the pleated web is then preferably fed to a heat applying station 40, preferably followed by cooling station 42 or alternatively by a passive cooling period so as to provide pleated web 50 with the desired pleated set.

Finally, web 50 with the pleated set or shape memory is then fed to a folding station 56 for folding along axes 36 so as to provide filter pack structure 10 having the desired zig-zag structure of wall portions 12 joined by face portions 16 at alternating edges 14 of wall portions 12.

In accordance with the invention, it should be noted that one or more additional stations could be provided in the system shown in FIG. 20 for carrying out additional steps such as applying glue or other adhesive material to bond adjacent peaks 18, or for applying protective coating to face portions 16, or for carrying out any other additional processing steps as desired in accordance with the present invention.

It should also be noted that the scoring steps, with or without heat, as discussed above render the pleating and folding steps of the method of the present invention more accurate and readily performed. However, it should be appreciated that the filter media may be pleated and folded into the filter pack structure 10 of the present invention without an initial scoring step if desired. Thus, the present invention is not specifically limited to requiring a scoring step.

Figure 21:
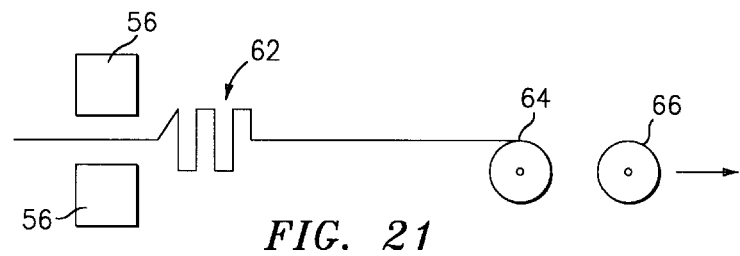
FIG. 21 illustrates an embodiment including a re-rolling step in accordance with the present invention to provide filter media according to the present invention in roll form.

Referring now to FIG. 21, it is also within the scope of the present invention to provide filter media 62, pleated and set with shape memory at least toward the pleated structure and preferably toward the folded structure, in a roll form for subsequent formation into the desired filter pack structure by a purchaser or end user thereof. As shown, filter media 62 may suitably be fed to a rolling station 64 after folding at folding station 56 so as to provide filter media in a roll 66 convenient for shipping, storage and subsequent unrolling for folding into filter pack structure as desired. If filter media 62 is to be rolled after folding, media 62 is preferably treated to provide shape memory toward the folded structure, and then unfolded and rolled. Alternatively, media 62 may be scored or heat scored along axes 36 and fed from pleating station 54 to rolling station 64 without folding, if desired.

In accordance with the present invention, it should be readily appreciated that a method has been provided for forming a filter pack structure which possesses enhanced rigidity for use in filter assemblies. Further, filter pack structure 10 formed in accordance with the present invention provides an excellent overall filter pressure drop by advantageously reducing the ratio of air flow to filter area, or air-media ratio, while maintaining a relatively low configuration pressure drop.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for making a pleated structure having a pleated shape memory, comprising the steps of:
    providing an elongated material having a longitudinal axis:
    pleating said material to form a pleated structure having a plurality of substantially parallel pleats substantially parallel to said longitudinal axis;
    folding the material along a plurality of axes substantially perpendicular to the longitudinal axis to form folds and provide a folded structure defining wall portions between the folds and face portions at the folds;
    heating the material in the pleated structure so as to provide a heated material; and
    cooling the heated material so as to provide the material with shape memory toward the pleated structure.

2. A method according to claim 1, further comprising the steps of heating and cooling the material in the folded structure so as to provide the material with shape memory toward the folded structure.

3. A method according to claim 2, further comprising heating and cooling the material in a pleated and folded structure so as to provide the material with shape memory to the pleated and folded structure.

4. A method according to claim 1, wherein the cooling step comprises allowing the heated material to cool.

5. A method according to claim 1, wherein the cooling step comprises positively cooling the heated material.

6. A method according to claim 1, wherein the step of pleating the material comprises scoring the material along lines corresponding to the first plurality of substantially parallel pleats, and pleating the material by folding in alternating opposite directions along the lines.

7. A method according to claim 6, further comprising the step of scoring the material in a substantially diamond-shaped pattern centered along each axis of the plurality of axes.

8. A method according to claim 7, wherein the scoring step comprises scoring the material in a substantially diamond-shaped pattern centered along each axis of the plurality of axes so as to provide a series of diamond-shaped score lines arranged along each axis and meeting at adjacent points with the adjacent points positioned on an axis of the plurality of axes, and scoring the material along a second plurality of transverse lines substantially perpendicular to the first plurality of pleats and spaced to each side of each axis.

9. A method according to claim 8, further comprising the steps of applying force to the face portions of the folded structure at the adjacent points and to the wall portions at valleys corresponding to the adjacent points so as to provide the face portions with a series of substantially X-shaped indentations separated by peaks.

10. A method according to claim 1, wherein the material is a filter media and the folding step provides a filter pack having a substantially zig-zag folded structure.

11. A method according to claim 10, wherein the pleats of each wall portion define a series of alternating peaks and valleys, and wherein the folding step provides the filter pack with peaks of adjacent wall portions substantially adjacent to each other whereby spacing of the wall portions is maintained.

12. A method according to claim 11, further comprising the step of bonding peaks of adjacent wall portions which are substantially adjacent to each other together so as to enhance rigidity of the filter pack.

13. A method according to claim 10, further comprising the step of providing separators between adjacent wall portions so as to enhance rigidity of the filter pack.

14. A method according to claim 13, wherein the pleats of each wall portion define a series of alternating peaks and valleys, wherein the folding step provides the filter pack with peaks of adjacent wall portions substantially adjacent to each other, and wherein the step of providing separators comprises positioning a substantially flat sheet between the peaks of adjacent wall portions.

15. A method according to claim 14, further comprising the step of bonding peaks of the wall portions to separators positioned therebetween.

16. A method according to claim 10, wherein the pleating step comprises pleating the filter media so as to provide alternating peaks and valleys each formed by a double pleat so as to provide peaks with a substantially flat peak surface, and wherein the folding step provides the filter pack with flat peak surfaces of adjacent wall portions substantially adjacent to each other.

17. A method according to claim 10, wherein the folding step provides the filter pack having face portions connecting alternating edges of the wall portions.

18. A method according to claim 17, wherein the folding step provides the face portions having pleats along the folds, the pleats defining alternating peaks and valleys in the face portions.

19. A method according to claim 17, further comprising the step of coating the face portions with a protective material so as to enhance wear-resistance of the face portions.

20. A method according to claim 19, wherein the coating step comprises applying a protective material selected from the group consisting of glue, epoxy, plastic, cement, paint and mixtures thereof to the face portions.

21. A method according to claim 10, wherein the filter media is provided as a substantially elongate continuous web, and wherein the step of pleating the material comprises the steps of:
    feeding the web along a path to a pleating station for pleating the web along the plurality of pleats substantially parallel to the path to provide a pleated web;
    advancing the pleated web to a folding station for folding along the plurality of axes substantially perpendicular to the path to provide the filter pack; and
    after at least one of the feeding and advancing steps, advancing the web to a station for heating and cooling the web to provide the web with shape memory toward at least one of the pleated structure and the folded structure.

22. A method according to claim 21, further comprising the step of feeding the web material to a scoring station for scoring along at least one of the plurality of pleats substantially diamond-shaped pattern centered along the plurality of axes to provide a scored web, and feeding the scored web to at least one of the pleating station and the folding station.

23. A method according to claim 22, wherein the step of feeding to the scoring station comprises feeding the web to a scoring and heating station for heat scoring the web.

24. A method according to claim 1, further comprising the steps of heating and cooling the pleated structure prior to folding so as to provide the material with shape memory toward the pleating structure.

25. A filter pack having shape memory toward a pleated structure, comprising:
   a filter media folded along a plurality of axes in a substantially zig-zag folded structure to provide a plurality of wall portions connected at alternating edges by face portions, said folded filter media having a pleated structure including pleats along fold lines substantially perpendicular to the axes to provide each wall portion and face portion with alternating peaks and valleys, wherein the filter media has shape memory toward the pleated structure.

26. A filter pack according to claim 25, wherein the pleats define alternating peaks and valleys in the wall portions, and wherein peaks of adjacent wall portions are substantially adjacent to each other.

27. A filter pack according to claim 25, wherein the pleats define alternating peaks and valleys in the wall portions, and wherein peaks of adjacent wall portions are bonded together.

28. A filter pack according to claim 25, further comprising separator members positioned between adjacent wall portions.

29. A filter according to claim 28, wherein the pleats define alternating peaks and valleys in the wall portions, and wherein the peaks are bonded to adjacent separator members.

30. A filter pack according to claim 25, wherein the pleats define alternating peaks and valleys each defined by a double fold to provide substantially flat peak surfaces, and wherein peak surfaces of adjacent wall portions are substantially adjacent to each other.

31. A filter pack according to claim 25, wherein the face portions have pleats defining alternating peaks and valleys.

32. A filter pack according to claim 31, wherein the face portions are defined by a series of diamond-shaped sections joined at adjacent points, and wherein the adjacent points are positioned at peaks of the face portions.

33. A filter pack according to claim 31, wherein the face portions are defined by a series of substantially X-shaped indentations separated by peaks.

34. A filter pack according to claim 25, wherein the face portions are coated with a protective material.

35. A filter pack according to claim 25, wherein the filter media is selected from the group consisting of fibrous material, non-fibrous material, woven material, nonwoven material and combinations thereof.

36. A filter pack according to claim 25, wherein the filter media has shape memory toward the folded structure.

37. Filter media, comprising a roll of elongated filter material defining a central axis and having shape memory toward a plurality of substantially parallel longitudinal pleats substantially perpendicular to said central axis, whereby the material, when unwound from the roll, is urged toward a pleated structure.

38. A filter media according to claim 37, wherein the filter material further has shape memory toward a plurality of transverse folds, substantially perpendicular to the plurality longitudinal pleats whereby the material, when unwound from the roll form, is urged toward a substantially zig-zag folded structure folded at the transverse folds to define a plurality of wall portions connected at alternating edges by face portions, and having longitudinal pleats in the wall portions.

39. A filter media according to claim 37, wherein the filter material is scored in a diamond-shaped pattern along the transverse folds.

40. A filter media according to claim 39, wherein the filter material has shape memory toward folds along the diamond-shaped pattern.

41. Filter media, comprising filter material having a length and having shape memory toward a plurality of substantially parallel longitudinal pleats, said filter material further has shape memory toward a plurality of transverse folds, substantially perpendicular to the plurality longitudinal pleats, the filter material being provided in roll form whereby the material, when unwound from the roll form, is urged toward a pleated structure and toward a substantially zig-zag folded structure folded at the transverse folds to define a plurality of wall portions connected at alternating edges by face portions, and having longitudinal pleats in the wall portions.

* * * * *